US006590906B1

(12) United States Patent
Ishida et al.

(10) Patent No.: US 6,590,906 B1
(45) Date of Patent: Jul. 8, 2003

(54) MULTI-CARRIER TRANSMITTER CIRCUIT AND COMMUNICATION EQUIPMENT

(75) Inventors: Kaoru Ishida, Shijonawate (JP); Masayuki Miyaji, Takarazuka (JP); Hiroaki Kosugi, Hirakata (JP); Shin'ichi Kugou, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/377,988

(22) Filed: Aug. 20, 1999

(30) Foreign Application Priority Data

Aug. 24, 1998 (JP) .......................................... 10-237434

(51) Int. Cl.[7] ................................................. H04J 1/00
(52) U.S. Cl. ..................................................... 370/480
(58) Field of Search ................................. 370/204, 208, 370/335, 342, 343, 441, 206, 207, 482; 375/260, 295, 296, 297

(56) References Cited

U.S. PATENT DOCUMENTS

| 3,596,001 A | * | 7/1971 | Clark .......................... 370/204 |
| 3,648,178 A | * | 3/1972 | Hershberg ................... 370/482 |
| 4,054,909 A | * | 10/1977 | Kojima et al. ........... 375/240.01 |
| 4,066,964 A | * | 1/1978 | Costanza et al. ............ 340/7.42 |
| 4,207,521 A | * | 6/1980 | Takada ......................... 455/20 |
| 4,933,930 A | * | 6/1990 | Lien et al. ................... 370/436 |
| 5,398,241 A | * | 3/1995 | Witchey ...................... 370/391 |
| 5,694,396 A | * | 12/1997 | Firouzbakht et al. ........ 370/480 |
| 5,790,555 A | * | 8/1998 | Narahashi et al. ........... 370/480 |
| 6,522,869 B1 | * | 2/2003 | Hiramatsu et al. ........... 455/127 |

FOREIGN PATENT DOCUMENTS

| JP | 8-274734 | 10/1996 |
| WO | WO 96/18249 | 6/1996 |

OTHER PUBLICATIONS

PGPUB, Document ID: US 20010005401 A, Ishida et al., Multicarrier transmitting method and multicarrier transmitter circuit.*
CDMA System and Advanced Mobile Communication System, Chapter 1 and partial translation: Chapter 1–4 and 1–5.3.3 (Jun. 1, 1996).

* cited by examiner

Primary Examiner—Wellington Chin
Assistant Examiner—Jamal Fox
(74) Attorney, Agent, or Firm—Smith, Gambrell & Russell, LLP

(57) ABSTRACT

To reduce the size of a multi-carrier transmitter circuit for a mobile communication base station, by suppressing instantaneous peak output power to a small value with respect to a wide-band signal of a few MHz to tens of MHz so that the peak factor of a multi-carrier signal is reduced. In a multi-carrier transmitter circuit for modulating carriers with corresponding input signals to generate modulated signals and then multiplexing said modulated signals and outputting a multiplexed signal, the multi-carrier transmitter circuit is equipped with carrier generators 3-1 to 3-n for generating each said carrier, modulators 5-1 to 5-n for modulating each carrier with each input signal and outputting said modulated signal, an adder 6 for multiplexing said modulated signals and outputting the multiplexed signal, variable attenuators 2-1 to 2-n for directly or indirectly adjusting a level of each input signal, phase detectors 4-1 to 4-n for detecting a phase of each carrier, and a control circuit 7 for controlling the variable attenuators 2-1 to 2-n in accordance with the phase of each carrier.

21 Claims, 7 Drawing Sheets

MULTI-CARRIER TRANSMITTER CIRCUIT AND COMMUNICATION EQUIPMENT

BACKGROUND OF THE INVENTION

1. Field of the Invention

The present invention relates to a multi-carrier transmitter circuit that is chiefly used in a mobile communication base station.

2. Description of the Prior Art

In recent years, with the rapid spread of digital mobile communications, the installation of infrastructure including base stations has become an urgent necessity. Particularly, in cities, small base stations for use in insensitive zones, such as the shadows of buildings and subways, are necessary, so the existing large-scale base stations are being required to be reduced in size.

A conventional multi-carrier transmitter circuit will hereinafter be described with FIG. 6. In FIG. 6, reference numeral 501 denotes a public telephone network and 502 an exchange. 503-1 to 503-n denote n base band processing circuits, and 504-1 to 504-n denote n modulators. 505 denotes an adder, 506 a high frequency amplifier, and 507 an antenna.

For the signals being transmitted with the public telephone network 501 by users, necessary signals are taken out through the exchange 502, and are in turn outputted to each of n channels. In the base band processing circuits 503-1 to 503-n, the output n signals are given an appropriate base band process, such as a band-limiting filter process. The processed n signals (carriers) are modulated by the modulators 504-1 to 504-n and are analogically added by the adder 505. The output from the adder 505 is amplified by the high frequency amplifier 506 and is transmitted from the antenna 507.

Also, following a present digital portable telephone, the development of a portable telephone adopting a code division multiple access (CDMA) method capable of ensuring larger communication capacity has advanced. Since the CDMA method is described in "CDMA method and Next Generation Mobile Communication System" (Torikeppus Series, chapter 1), a detailed description thereof is omitted.

Such a base station for digital portable telephones employs linear modulation and transmits signals through multiple carriers, so the transmitter-receiver circuit requires strict linearity and a wide dynamic range.

With FIG. 7, a conventional multi-carrier transmitter circuit using the CDMA method will be described. In the figure, reference numerals 601-(1-1) to 601-(n-k) denote k×n channel input terminals, 602-(1-1) to 602-(n-k) denote k×n code multipliers, and 603-1 to 603-n denote n digital adders. 604-1 to 604-n denote n modulators and 605-1 to 605-n denote n carrier generators. 606 denotes an adder, 607 a code selecting circuit, and 608 an output terminal.

The k×n channel signals taken out through an exchange are input to the channel input terminals 601-(1-1) to 601-(n-k). In the code multipliers 602-(1-1) to 602-(n-k), the input channel signals are multiplied by the codes selected by the code selecting circuit 607, respectively. The k signals of the k×n channel signals are added into a single signal by each of the digital adders 603-1 to 603-n, and n outputs are obtained. The modulators 604-1 to 604-n modulate the n outputs and the n carriers generated by the carrier generators 605-1 to 605-n, respectively. The n modulated signals are analogically added by the adder 606, thereby a multi-carrier signal is obtained. This signal is amplified by a high-frequency power amplifying circuit and transmitted via an antenna.

Particularly, the transmitter circuit includes a circuit handling high power, such as a power amplifying circuit or the like, and is designed so that average output power can be covered up to instantaneous peak output power with saturated output power, in order to maintain linearity. In addition, since a high transmission rate becomes necessary for obtaining large communication capacity, the band width of a transmitted signal ranges from a few MHz to tens of MHz. For this reason, the transmitter circuit needs to employ a circuit that can follow a signal change of one-tenth of a microsecond.

However, if the peak factor between the instantaneous peak output power and the average output power becomes greater, the transistor in the used power amplifying circuit will be increased in size and therefore there will be a need to use an output level reduced greatly from the saturated output power. If the level is thus reduced, the ratio (power conversion efficiency) between the DC supply power to the power amplifying circuit and the transmitted power will be reduced.

The reason why in this multi-carrier signal the peak factor becomes greater will be described. In general, the multi-carrier signal includes multiple carriers simultaneously at certain frequency intervals, as shown in FIG. 2(a). In FIG. 2(a), f1 is a frequency of the first carrier, f2 is a frequency of the second carrier, fn is a frequency of the nth carrier, and power is the output power of each carrier. The phase relation between these carriers varies with the lapse of time. During this variation, when two or more of the multiple carriers approach the same phase, as shown in FIG. 2(b), the total power becomes large instantaneously. In FIG. 2(b), f1 is a frequency of the first carrier, f2 is a frequency of the second carrier, fn is a frequency of the nth carrier, I is an in-phase axis of the signal, and Q is a quadrature-phase axis of the signal. Particularly, as the number of carriers with the same phase becomes greater, an instantaneous larger peak output power is generated as compared with the average output power, as shown in FIG. 2(c). In FIG. 2(c), power is the output power of each carrier, average power is the average power of the synthesized wave of f1-fn, and peak power is the instant maximum power of the synthesized wave of f1-fn. With respect to such a signal whose ratio of the peak output power against such an average output power (i.e., peak factor) is large, the size of transistors used in the power amplifying circuit becomes larger, so that a ratio between DC supply power to the power amplifying circuit and transmitted power (i.e., power conversion efficiency) will be reduced.

Particularly, in the CDMA method the peak factor doubles as compared with a conventional time division multiple access (TDMA) method. Moreover, since the codes, which is the feature of the CDMA-method, is multiplexed, the peak factor becomes larger. When the number of codes to be multiplexed is maximum, the CDMA method has a peak factor of about 13 dB. Furthermore, if multiple carriers with the codes are further multiplexed, the peak factor will become even larger. For this reason, a transmitter circuit, such as a power amplifying circuit or the like, requires fairly strict linearity, as compared with prior art and there is a need to employ an element that can output power ten or more times the actual operating power. As a result, the circuit scale of the transmitter circuit becomes large and the miniaturization of a base station becomes difficult.

Incidentally, as a countermeasure to reduce a peak factor, a multi-carrier transmitter circuit employing feedback control, as shown in Japanese Patent Laid-Open Nos. 8-274734 and 8-818249, has been proposed. This circuit adopts feedback configuration. For this reason, when transmitting a signal with a narrow band (a few kHz to hundreds of kHz), the varying speed of the signal is tens of microseconds or more and the circuit can follow the varying speed, but the circuit cannot follow the varying speed of a wide-band signal of a few MHz to tens of MHz and therefore application of this circuit is difficult.

BRIEF SUMMARY OF THE INVENTION

Object of the Invention

The present invention has been made in view of the problems found in the aforementioned conventional multi-carrier transmitter circuit. Accordingly, the object of the present invention is to provide a multi-carrier transmitter circuit which is capable of achieving circuit miniaturization, by suppressing instantaneous peak output power to a small value with respect to a wide-band signal of a few MHz to tens of MHz so that the peak factor of a multi-carrier signal is reduced.

The present invention is a multi-carrier transmitter circuit for modulating carriers with corresponding n input signals (where n is an integer of 2 or more) to generate n modulated signals and then multiplexing said n modulated signals and outputting a multiplexed signal, the multi-carrier transmitter circuit comprising:

n carrier generating means for generating each said carrier;

n modulating means for modulating each said carrier with each said input signal and outputting said modulated signal;

multiplexing means for multiplexing said n modulated signals and outputting said multiplexed signal;

level varying means for directly or indirectly adjusting a level of each said modulated signal;

n carrier phase detecting means for detecting a phase of each said carrier; and control means for controlling said level varying means in accordance with the phase of each said carrier detected by each said carrier phase detecting means.

According to the first present invention, the miniaturization of a transmitter circuit becomes possible, by suppressing instantaneous peak output power to a small value with respect to a wide-band signal of a few MHz to tens of MHz so that the peak factor of a multi-carrier signal is reduced.

That is, the multi-carrier transmitter circuit of a first present invention previously detects the phase of each modulated signal of a multi-carrier signal, predicts the phase relation of each modulated signal indicating instantaneous peak output power, and directly or indirectly adjusts the level of each modulated signal in accordance with the phase relation. With this, the level of each modulated signal in a relation of the same phase or a relation close to that is lowered to reduce the peak factor of the multi-carrier signal. With this, the saturated output power of a power amplifier can be reduced, so that element size can be reduced. As a result, the size of the transmitter circuit including the power amplifier can be reduced.

BRIEF DESCRIPTION OF THE DRAWINGS

The above and other objects and advantages will become apparent from the following detailed description when read in conjunction with the accompanying drawings in which:

FIG. 2($b$) is a diagram showing the phase relation of the general multi-carrier signal;

FIG. 2($c$) is a diagram showing a time change in the total power of the multi-carrier signal;

FIG. 3($b$) is a diagram showing a time change in the total power of the multi-carrier signal in the first embodiment controlling the attenuation amounts of the variable attenuators under the same condition as FIG. 2($b$);

DESCRIPTION OF SYMBOLS

1-1 to 1-n Input terminal
2-1 to 2-n Variable attenuator
3-1 to 3-n Carrier generator
4-1 to 4-n Phase detector
5-1 to 5-n Modulator
6 Adder
7 Control circuit
8 Output terminal
9 Code selecting circuit
10-1 to 10-m Channel input terminal
20-1 to 20-m Code multiplier
A1 to An Digital adder

DETAILED DESCRIPTION OF THE PREFERRED EMBODIMENTS

The embodiments of the present invention will hereinafter be described with reference to the drawings.

First Embodiment

First, a first embodiment of the present invention will be described with reference to FIGS. 1 to 3.

Figure 1:
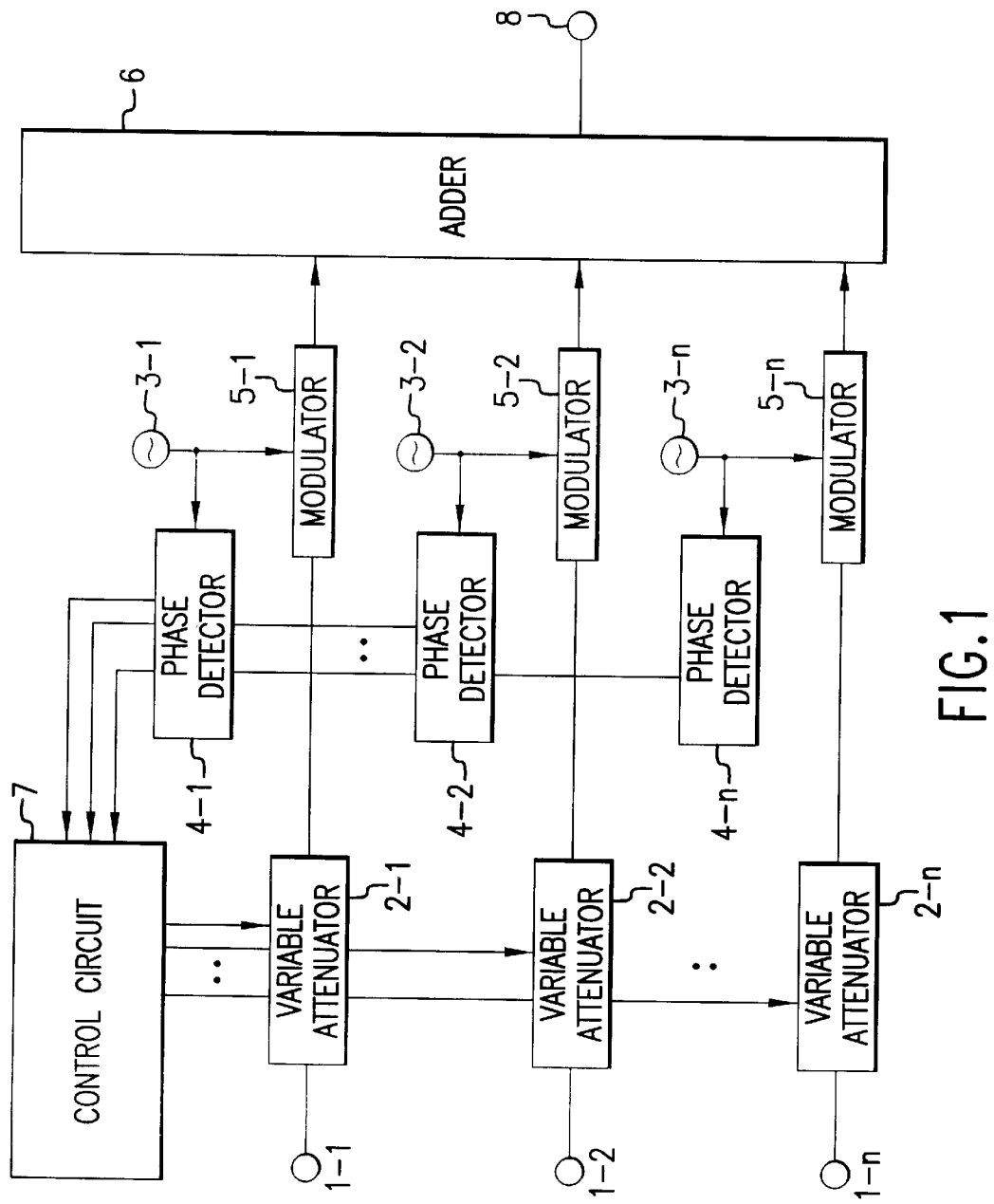
FIG. 1 is a block diagram showing a multi-carrier transmitter circuit in a first embodiment of the present invention.

FIG. 1 is a block diagram showing a multi-carrier transmitter circuit in the first embodiment of the present invention. In the diagram, reference numerals 1-1 to 1-n denote n input terminals, 2-1 to 2-n denote n variable attenuators (corresponding to level varying means of the present invention), 3-1 to 3-n denote n carrier generators (corresponding to carrier generating means of the present invention), 4-1 to 4-n denote n phase detectors (corresponding to carrier phase detecting means of the present invention), and 5-1 to 5-n denote n modulators (corresponding tomodulating means of the present invention) Reference numeral 6 denotes an adder (corresponding to multiplexing means of the present invention), 7 a control circuit (corresponding to control means of the present invention), and 8 an output terminal.

In FIG. 1, n signals input with equal power to the input terminals 1-1 to 1-n (corresponding to input signals of the present invention) are passed through the variable attenuators 2-1 to 2-n and attenuated by predetermined amounts of attenuation, respectively. The attenuated signals are input to the modulators 5-1 to 5-n, which in turn modulate carriers generated with the carrier generators 3-1 to 3-n (corresponding to carriers of the present invention), by the n input signals. The outputs of the modulators 5-1 to 5-n (corresponding to modulated signals of the present invention) are added with the adder 6. The output of the adder 6 (corresponding to a multiplexed signal of the present invention) is output to the output terminal 8.

Here, the procedure of attenuating the input signals with the variable attenuators 2-1 to 2-n will be described. The phase detectors 4-1 to 4-n previously detect the phases of the carriers output from the carrier generators 3-1 to 3-n, for example, by employing a warming period before actual transmission. The phase relation varies according to the time that elapsed since phase detection was performed, but if the frequency of each carrier is known, it is possible to predict the phase relation at the time. Based on information about the detected phases, the control circuit 7 predicts the phase relation between carriers and controls the amount of attenuation of each of the variable attenuators 2-1 to 2-n in accordance with the predicted phase relation.

For the control of the attenuation amount, a description will hereinafter be made in detail with FIGS. 2 and 3. FIG. 2 is a diagram showing a conventional, general multi-carrier signal. FIG. 2($a$) is a diagram showing the frequency spectrum of the general multi-carrier signal, FIG. 2($b$) is a diagram showing the phase relation of the general multi-carrier signal, and FIG. 2($c$) is a diagram showing a time change in the total power of the general multi-carrier transmission signal.

Figure 2A:
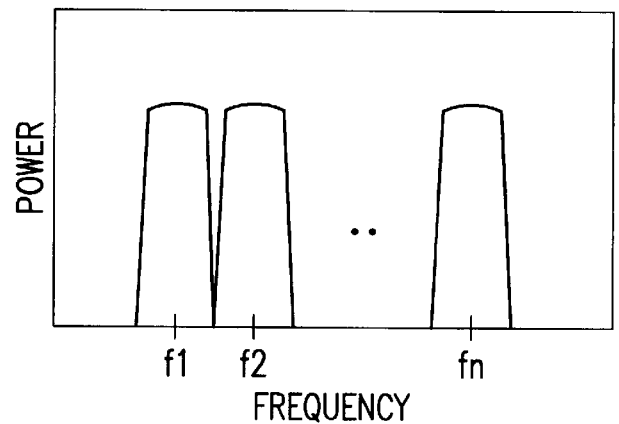
FIG. 2($a$) is a diagram showing the frequency spectrum of a general multi-carrier signal.
Figure 2B:
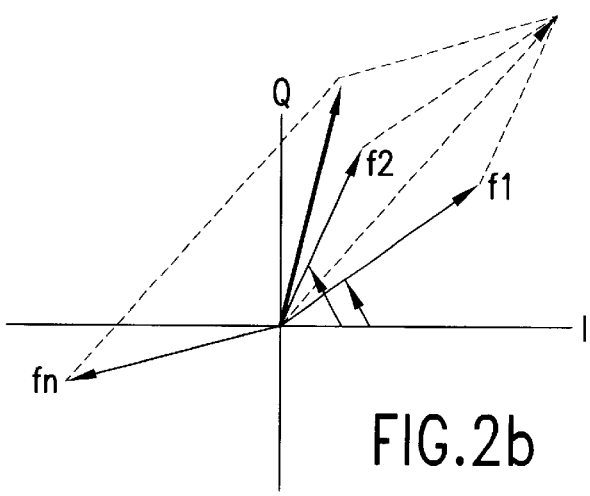
Figure 2C:
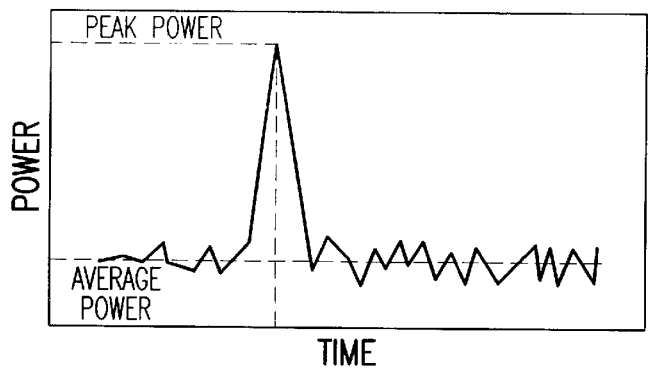
Figure 3A:
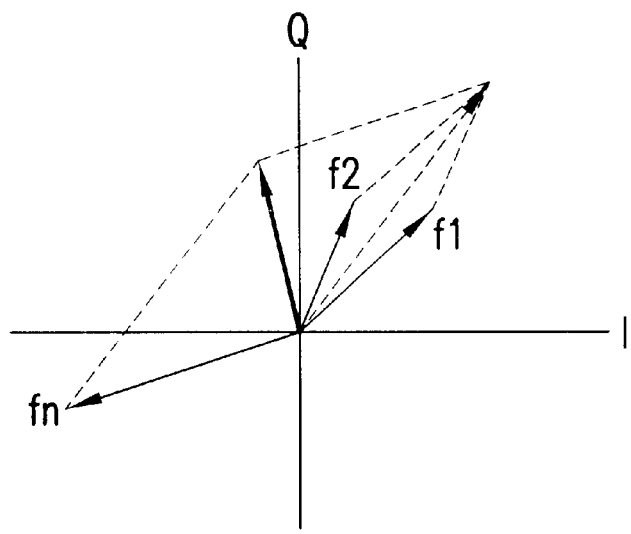
FIG. 3($a$) is a diagram showing the phase relation of a multi-carrier signal in the first embodiment controlling the attenuation-amounts of the variable attenuators under the same condition as FIG. 2($b$)
Figure 3B:
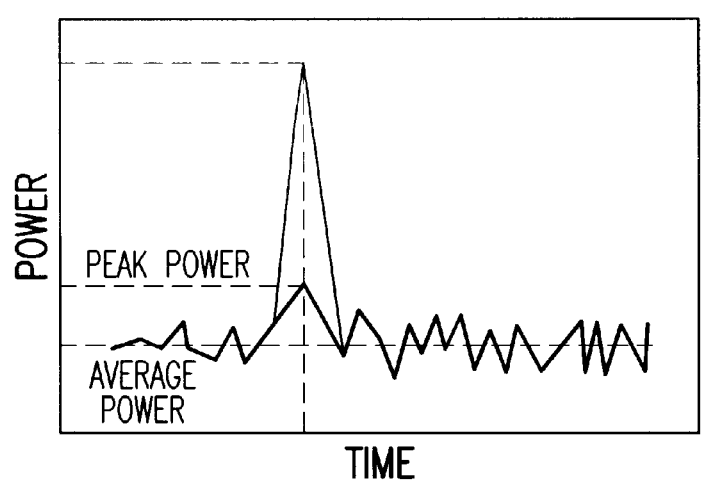

FIG. 3 is a diagram showing a multi-carrier signal in the first embodiment of the present invention. FIG. 3($a$) is a diagram showing the phase relation of the multi-carrier signal in the first embodiment controlling the attenuation amounts of the variable attenuators under the same condition as FIG. 2($b$), and FIG. 3($b$) is a diagram showing a time change in the total power of the multi-carrier signal in the first embodiment controlling the attenuation amounts of the variable attenuators under the same condition as FIG. 2($b$). Note that the frequency spectrum of the multi-carrier signal in the first embodiment is the same as FIG. 2($a$). In FIG. 3($a$), f1 is a frequency of the first carrier, f2 is a frequency of the second carrier, fn is a frequency of the nth carrier, I is an in-phase axis of the signal, and Q is a quadrature-phase axis of the signal. In FIG. 3($b$), power is output power of each carrier, average power is the average power of the synthesized wave of f1-fn, and peak power is instant maximum power of the synthesized wave of f1-fn.

As described in the description of the related art, generally the multi-carrier signal includes multiple carriers simultaneously at certain frequency separations. The phase relation between these carriers varies with the lapse of time. During this variation, when two or more of the multiple carriers approach the same phase, the total power becomes large instantaneously. Particularly, as the number of carriers having the same phase becomes greater, instantaneous larger peak output power is generated. With respect to such a signal whose peak factor is large, the size of transistors used in the power amplifying circuit becomes larger, so that a ratio between DC supply power to the power amplifying circuit and transmitted power (i.e., power conversion efficiency) will be reduced.

Hence, in a phase relation such as that shown in FIG. 2($b$), the amplitudes of f1 and f2 are suppressed and the amplitudes of frequencies other than those are increased, while the phase relation is being held as shown in FIG. 3($a$). With this, the peak of the total power can be suppressed low as shown in FIG. 3($b$). The reason why the amplitudes of the other frequencies are increased is that the total power is balanced as a whole.

The control circuit 7 is used for controlling the attenuation amounts of the variable attenuators 2-1 to 2-n so that they correspond to the amplitudes of the frequencies in FIG. 3($b$). Thus, by suppressing low the peak output power of the total power with respect to the average output power, the size of transistors used in the power amplifying circuit can be reduced and the power conversion efficiency of the power amplifying circuit can be enhanced.

In the first embodiment, it has been described that the level varying means of the present invention is connected to the input side of the modulator as a variable attenuator and the level of each modulated signal is indirectly adjusted by adjusting the level of each input signal of the present invention. However, the present invention is not to be limited to this. For example, the level varying means may be connected to the output side of the modulator to directly adjust the level of each modulated signal of the present invention. It may also be connected to the output side of the carrier generator to modulate of each carrier of the present invention. Even if the level of each modulated, signal of the present invention were indirectly adjusted in this manner, the same effect will be obtainable.

In short, if the level varying means is a means of directly or indirectly adjusting the level of each modulated signal of the present invention, the same effect will be obtained. Also, even a combination with a variable gain amplifier can obtain the same effect.

Figure 5:
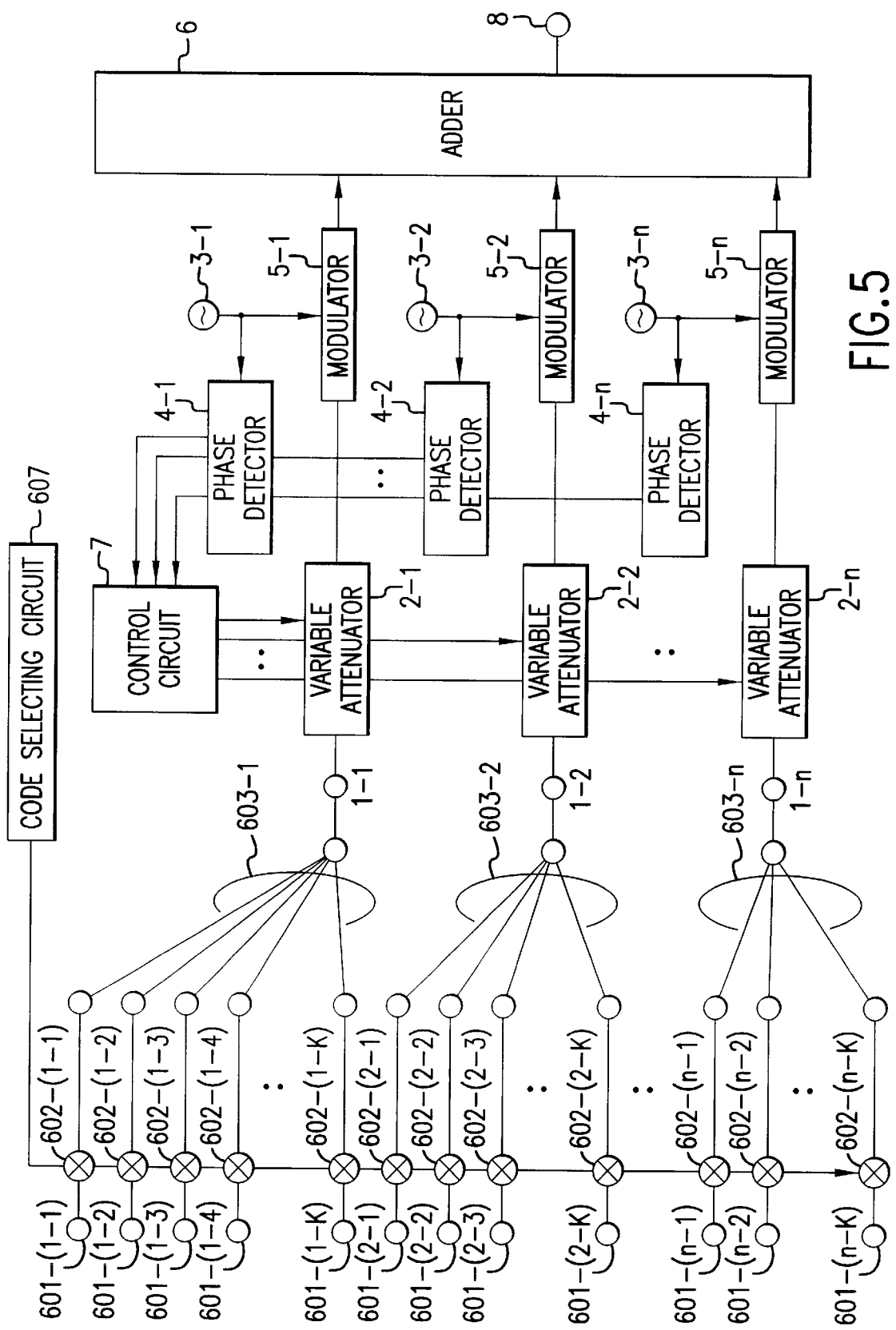
FIG. 5 is a block diagram showing a multi-carrier transmitter circuit in another embodiment of the present invention.
Figure 7:
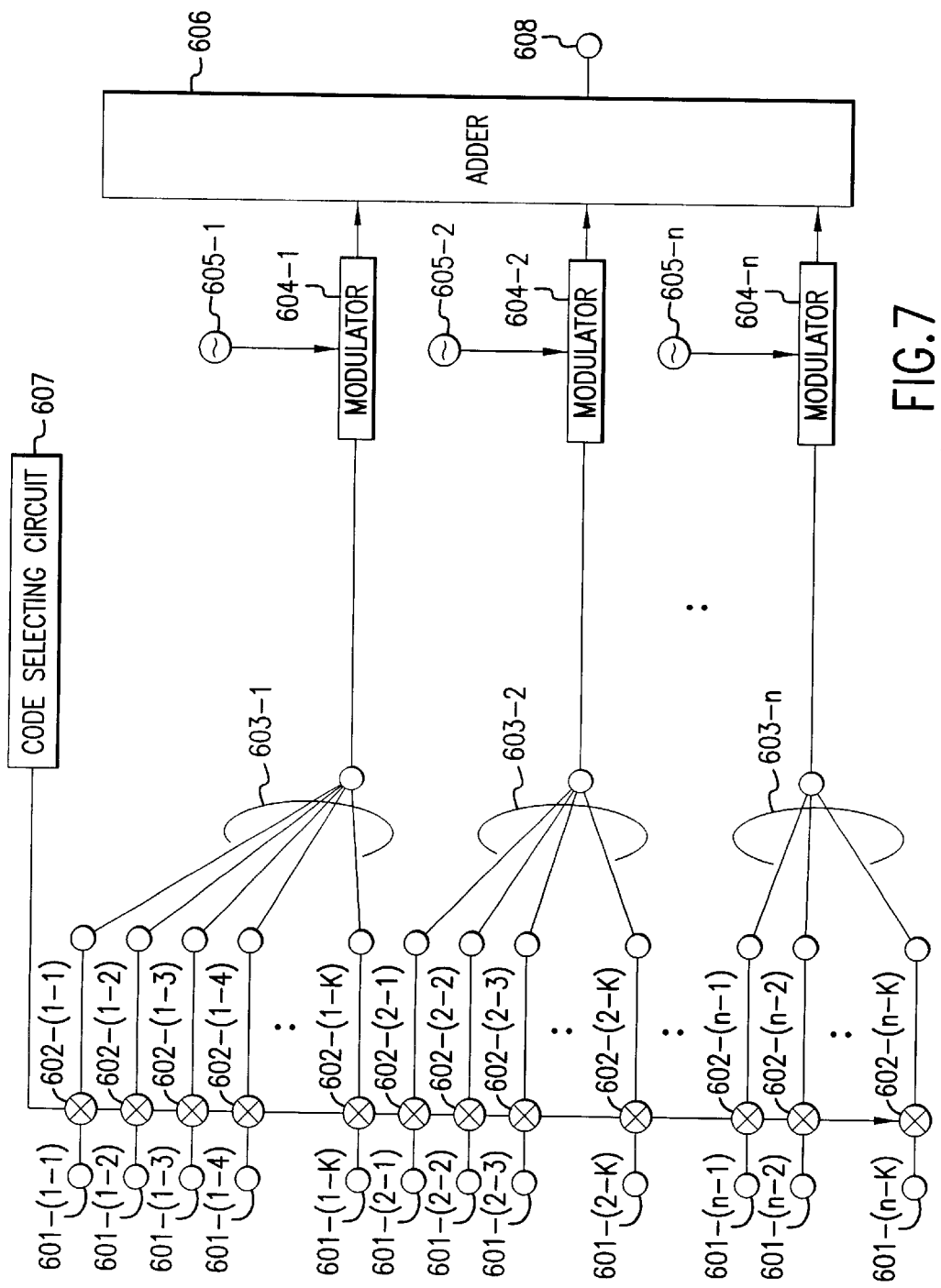
FIG. 7 is a block diagram of another conventional multi-carrier transmitter circuit.

In addition, in the first embodiment of the present invention, if the digital adders 603-1 to 603-n of FIG. 7 are connected at a ratio of 1:1 to the input terminals 1-1 to 1-n, this embodiment will be applied to a multi-carrier transmitter circuit using the CDMA method. The example is shown in FIG. 5.

Second Embodiment

Now, a second embodiment of the present invention will be described with reference to the drawings. The difference between this embodiment and the aforementioned first embodiment is that this embodiment is further equipped with code modulating means, code selecting means, and preparation multiplexing means. Therefore, this embodiment is the same as the first embodiment, as long as a description is not particularly made. For parts given the same reference numerals as the first embodiment, the parts have the same function as the first embodiment, as long as a description is not particularly made.

Figure 4:
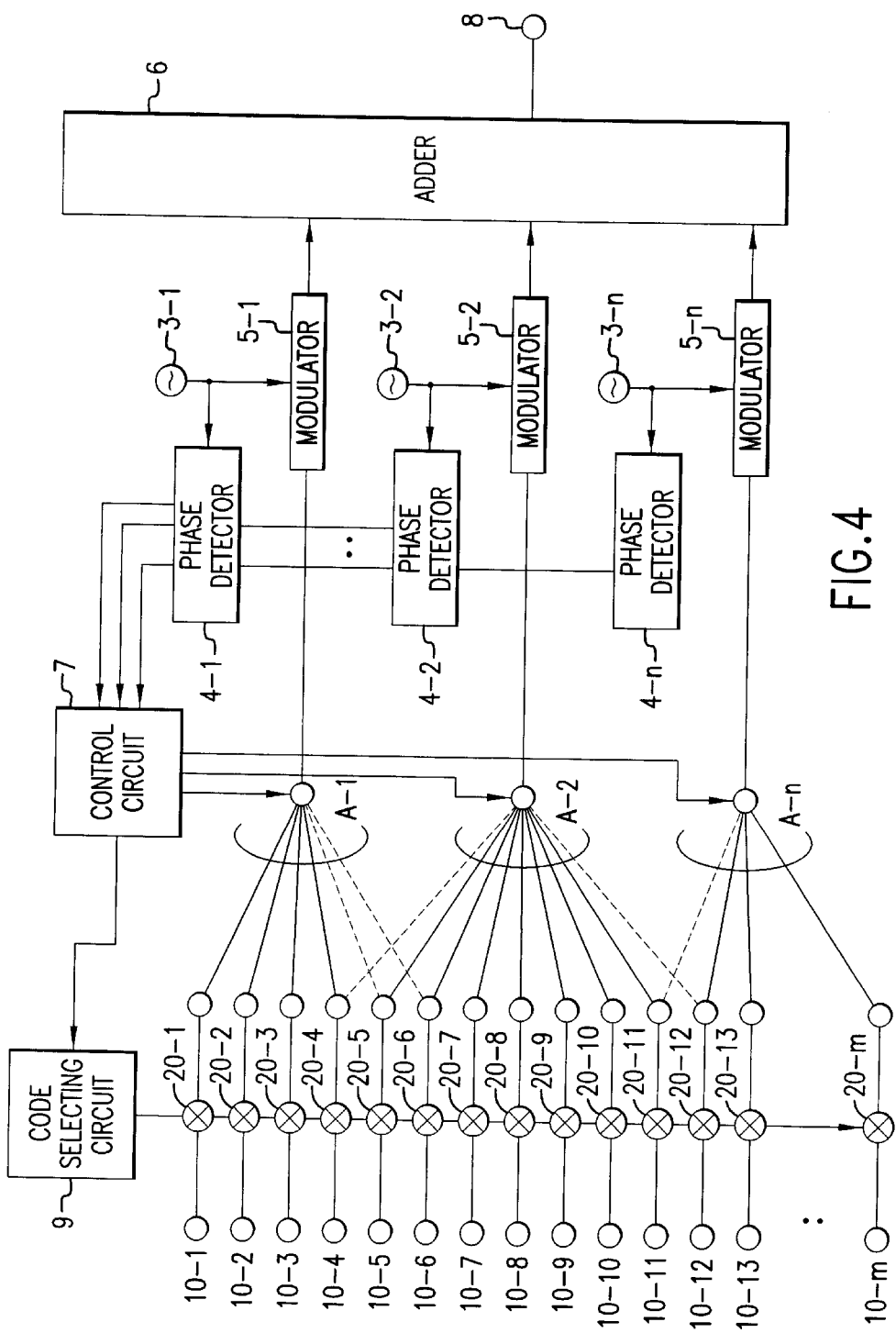
FIG. 4 is a block diagram showing a multi-carrier transmitter circuit in a second embodiment of the present invention.

FIG. 4 is a block diagram showing a multi-carrier transmitter circuit in the second embodiment of the present invention. In the diagram, reference numerals 10-1 to 10-m denote m channel input terminals and 20-1 to 20-m denote m code multipliers (corresponding to code modulating means of the present invention). 9 is a code selecting circuit (corresponding to code selecting means of the present invention) that selects a code to be given to each code multiplier in accordance with a designate from a control circuit 7, and A1 to An are n digital adders (corresponding to preparation multiplexing means of the present invention) that digitally add the outputs of the code multipliers of predetermined number of channels in accordance with a designate from the control circuit 7.

In FIG. 4, channel signals with an equal amplitude input to the channel input terminals 10-1 to 10-m (corresponding to preparation input signals of the present invention) are multiplied by codes specified by the code selecting circuit 9 with the code multipliers 20-1 to 20-m. The channel signals multiplied by codes (corresponding to preparation coded signals of the present invention) are input to the digital adders A1 to An specified by the control circuit 7 and are digitally added and multiplexed. The multiplexed channel signals (corresponding to input signals of the present invention) are input to modulators 5-1 to 5-n. The operation after the modulators 5-1 to 5-n is performed in the same way as the first embodiment.

Here, the procedure of specifying channel signals that are input to the digital adders A1 to An by the control circuit 7 will be described. The phase detectors 4-1 to 4-n previously detect the phases of the carriers output from the carrier generators 3-1 to 3-n, for example, by employing a warming period before actual transmission. The phase relation varies according to the time that elapsed since phase detection was performed, but if the frequency of each carrier is known, it is possible to predict the phase relation at the time. Based on information about the detected phases, the control circuit 7 predicts the phase relations between carriers. In accordance with the predicted phase relations, the code selecting circuit 9 selects codes that are assigned to the channel signals. The selected codes are given to the code multipliers 20-1 to 20-m, respectively. Furthermore, the control circuit 7 specifies the number of channel signals that are added to the n digital adders A-1 to A-n, in accordance with the predicted phase relations. The control circuit 7 determines this number so that the number corresponds to the amplitudes of the frequencies of FIG. 3($b$) described in the first embodiment. With this, the multiplexed input signals to the modulators 5-1 to 5-n are determined by the number of the multiplexed channel signals. Since this number is determined by the phase relation between carriers, the same effect as the first embodiment is obtainable.

Notice that the aforementioned selection of codes are performed so that codes do not match each other between the channel inputs connected to the same digital adder A.

As a method of adjusting the level of a modulated signal, in FIG. 4 a method of adjusting the level of an encoded signal by a phase is possible in addition to the aforementioned method.

As another method of adjustment, a method of adjusting the level of a modulated signal by adjusting the code selected by the code selecting circuit 9 is possible.

In the second embodiment, if it is assumed that m is a multiple of n and that, in the initial state, lines are connected so that the digital adders A-1 to A-n multiplex m/n channel signals into a single multiplexed signal, then this embodiment will be applied to the multi-carrier transmitter circuit using the CDMA method.

In the aforementioned first and second embodiments, it has been described that when the phases of two or more carriers are in a predetermined relation including a relation of the same phase, the control means of the present invention determines the level of each modulated signal so that the level of a multiplexed signal becomes smaller compared with the case where adjustments by the level varying means is not performed, and controls the level varying means so that the level of each modulated signal reaches the determined level. But, when the allowable maximum value of the peak power is set, the control means may determine the level of each modulated signal so that the level of the multiplexed signal does not exceed a predetermined value. In addition, when there is a demand that, conversely, output should not be reduced to a predetermined level and below, the control means may determine the level of each modulated signal so that the level of the multiplexed signal becomes larger. That is, the control means of the present invention will be sufficient if it can control the level varying means in accordance with the phase of each carrier detected by each carrier phase detecting means.

Note that the present invention is not to be limited to the CDMA method, but is also applicable to other multi-carrier methods, such as a FDMA method, a TDMA method or the like.

Figure 6:
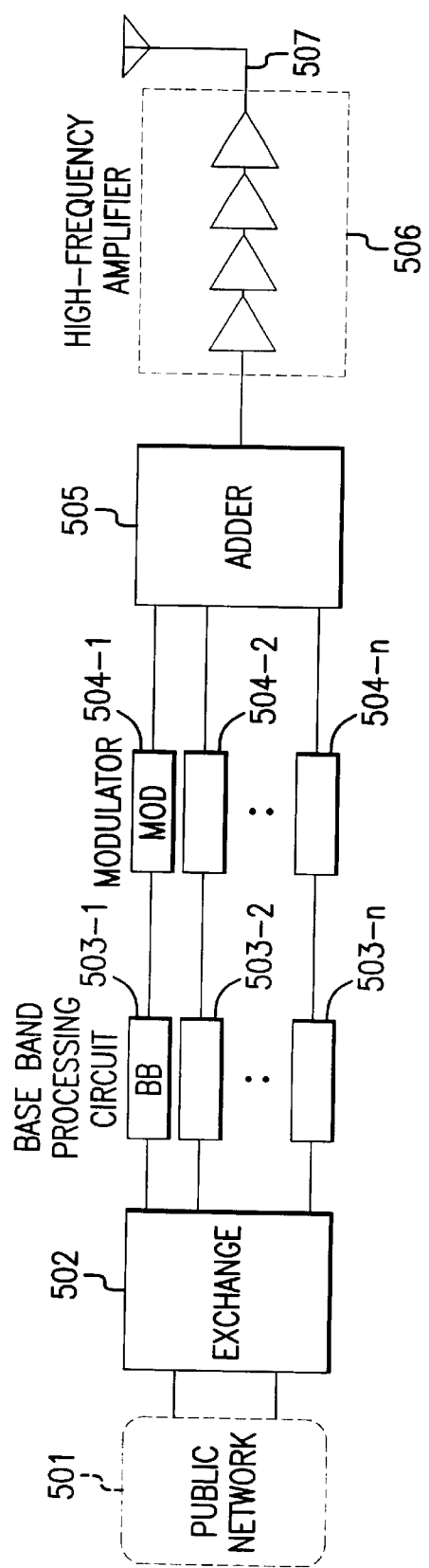
FIG. 6 is a basic block diagram of a conventional multi-carrier transmitter circuit.

Furthermore, the transmitter according to the present invention is provided with the above described multi-carrier transmitter circuit as well as a high frequency amplifying circuit for amplifying the output of the multi-carrier transmitter circuit as shown in FIG. 6 and an antenna for transmitting the amplified signal to outside.

As apparent from the foregoing description, the present invention can provide a multi-carrier transmitter circuit which is capable of achieving circuit miniaturization, by suppressing instantaneous peak output power to a small value with respect to a wide-band signal of a few MHz to tens of MHz so that the peak factor of a multi-carrier signal is reduced.

That is, the multi-carrier transmitter circuit of the present invention previously detects the phase of each carrier of a multi-carrier signal, predicts that the phases of two or more carriers is the same phase when the detected phase is in a phase relation indicating instantaneous peak output power, and controls the level of each modulated signal. With this, with respect to a wide-band signal of a few MHz to tens of MHz, instantaneous peak output power is suppressed to a small value and the peak factor of the multi-carrier signal is reduced, whereby miniaturization of the transmitter circuit becomes possible.

While the present invention has been described with reference to the preferred embodiments thereof, the invention is not to be limited to the details given herein, but may be modified within the scope of the appended claims.

What is claimed is:

1. A multi-carrier transmitter circuit for modulating carriers with corresponding n input signals (where n is an integer of 2 or more) to generate n modulated signals and then multiplexing said n modulated signals and outputting a multiplexed signal, the multi-carrier transmitter circuit comprising:

n carrier generating means for generating each said carrier;

n modulating means for modulating each said carrier with each said input signal and outputting said modulated signal;

multiplexing means for multiplexing said n modulated signals and outputting said multiplexed signal;

level varying means for directly or indirectly adjusting a level of each said modulated signal;

n carrier phase detecting means for detecting a phase of each said carrier; and control means for controlling said level varying means in accordance with the phase of each said carrier detected by each said carrier phase detecting means.

2. The multi-carrier transmitter circuit as set forth in claim 1, further comprising m code modulating means for generating m preparation encoded signals (where m is an integer of n or more), by encoding m preparation input signals by corresponding codes;

code selecting means for selecting said code for each said preparation input signal; and n preparation multiplexing means for multiplexing said m preparation encoded signals to generate said n input signals.

3. The multi-carrier transmitter circuit as set forth in claim 1, wherein said level varying means indirectly adjusts the level of each said modulated signal, either by adjusting the level of each said input signal or by adjusting the level of each said carrier.

4. The multi-carrier transmitter circuit as set forth in claim 2, wherein said level varying means indirectly adjusts the level of each said modulated signal, either by adjusting the level of each said input signal or by adjusting the level of each said carrier.

5. The multi-carrier transmitter circuit as set forth in claim 2, wherein said level varying means indirectly adjusts the level of each said modulated signal by switching connections of lines through which each said preparation encoded signal is input to each said preparation multiplexing mean, and said control means determines the number of said preparation encoded signals that each said preparation multiplexing means multiplexes, in accordance with the phase of each said carrier detected by each said carrier phase detecting means, thereby controlling said level varying means; and said code selecting means selects said codes, based on said switching of connections.

6. The multi-carrier transmitter circuit as set forth in claim 2, wherein said level varying means adjusts the level of each said modulated-signal, by adjusting the levels of m preparation input signals before they are encoded.

7. The multi-carrier transmitter circuit as set forth in claim 2, wherein said level varying means adjusts the levels of said modulated signal by adjusting said codes.

8. The multi-carrier transmitter circuit as set forth in claim 5, wherein said m is a multiple of n, and in an initial state, lines are connected so that each said preparation multiplexing means multiplexes m/n preparation encoded signals of said preparation encoded signals and generates a single multiplexed signal.

9. The multi-carrier transmitter circuit as set forth in claim 2, wherein said level varying means indirectly adjusts the level of each said modulated signal by adjusting the level of each said preparation encoded signal.

10. The multi-carrier transmitter circuit as set forth in claim 1, wherein when the phase relation of said two or more carriers is a certain relation including the same phase, the level of each said modulated signal is decided so that the level of said multiplexed signal may be smaller as compared with the case where any adjustment is not performed by said level varying means, and said level varying means is controlled to obtain the predetermined level.

11. The multi-carrier transmitter circuit as set forth in claim 2, wherein when the phase relation of said two or more carriers is a certain relation including the same phase, the level of each said modulated signal is decided so that the level of said multiplexed signal may be smaller as compared with the case where any adjustment is not performed by said level varying means, and said level varying means is controlled to obtain the predetermined level.

12. The multi-carrier transmitter circuit as set forth in claim 3, wherein when the phase relation of said two or more carriers is a certain relation including the same phase, the level of each said modulated signal is decided so that the level of said multiplexed signal may be smaller as compared with the case where any adjustment is not performed by said level varying means, and said level varying means is controlled to obtain the predetermined level.

13. The multi-carrier transmitter circuit as set forth in claim 4, wherein when the phase relation of said two or more carriers is a certain relation including the same phase, the level of each said modulated signal is decided so that the level of said multiplexed signal may be smaller as compared with the case where any adjustment is not performed by said level varying means, and said level varying means is controlled to obtain the predetermined level.

14. The multi-carrier transmitter circuit as set forth in claim 10, wherein the level of each said modulated signal is decided so that the level of said multiplexed signal does not exceed the predetermined value.

15. The multi-carrier transmitter circuit as set forth in claim 11, wherein the level of each said modulated signal is decided so that the level of said multiplexed signal does not exceed the predetermined value.

16. The multi-carrier transmitter circuit as set forth in claim 12, wherein the level of each said modulated signal is decided so that the level of said multiplexed signal does not exceed the predetermined value.

17. The multi-carrier transmitter circuit as set forth in claim 13, wherein the level of each said modulated signal is decided so that the level of said multiplexed signal does not exceed the predetermined value.

18. A communication device for performing communication comprising:

a multi-carrier transmitter circuit as set forth in any of claim 1;

a high frequency amplifier for amplifying the outputs of said multi-carrier transmitter circuit; and an antenna for transmitting the output of said high frequency amplifier.

19. A communication device for performing communication comprising:

a multi-carrier transmitter circuit as set forth in any of claim 2;

a high frequency amplifier for amplifying the outputs of said multi-carrier transmitter circuit; and an antenna for transmitting the output of said high frequency amplifier.

20. A communication device for performing communication comprising:

a multi-carrier transmitter circuit as set forth in any of claim 3;

a high frequency amplifier for amplifying the outputs of said multi-carrier transmitter circuit; and an antenna for transmitting the output of said high frequency amplifier.

21. A communication device for performing communication comprising:

a multi-carrier transmitter circuit as set forth in any of claim 4;

a high frequency amplifier for amplifying the outputs of said multi-carrier transmitter circuit; and an antenna for transmitting the output of said high frequency amplifier.

* * * * *